(12) United States Patent
Hoehn (10) Patent No.: US 12,111,415 B2
(45) Date of Patent: Oct. 8, 2024

(54) RADAR SYSTEM

(71) Applicant: Sicoya GmbH, Berlin (DE)

(72) Inventor: Christoph Hoehn, Berlin (DE)

(73) Assignee: Sicoya GmbH, Berlin (DE)

( * ) Notice: Subject to any disclaimer, the term of this patent is extended or adjusted under 35 U.S.C. 154(b) by 255 days.

(21) Appl. No.: 17/725,250

(22) Filed: Apr. 20, 2022

(65) Prior Publication Data
US 2023/0341514 A1 Oct. 26, 2023

(51) Int. Cl.
*G01S 7/35* (2006.01)
*G01S 13/931* (2020.01)

(52) U.S. Cl.
CPC ............ *G01S 7/352* (2013.01); *G01S 13/931* (2013.01)

(58) Field of Classification Search
CPC .......... H04B 10/25753; H04B 10/2575; H03H 9/6406; G02F 1/1023
See application file for complete search history.

(56) References Cited

U.S. PATENT DOCUMENTS

| | | | | |
|---|---|---|---|---|
| 5,949,366 A * | 9/1999 | Herrmann | ............. | G01S 13/931 342/72 |
| 8,666,253 B2 * | 3/2014 | Williams | ........... | H04B 10/2575 398/115 |
| 2002/0106142 A1 * | 8/2002 | Huang | .................. | G02F 1/0123 385/8 |
| 2005/0057791 A1 * | 3/2005 | Sayyah | .................. | H03L 7/099 359/245 |
| 2007/0166053 A1 * | 7/2007 | Kondo | ...................... | G01S 7/35 398/183 |
| 2014/0022119 A1 * | 1/2014 | Lohr | .................. | H04B 10/2575 342/25 R |
| 2018/0248518 A1 * | 8/2018 | Nicholls | .............. | H03H 9/6406 |
| 2019/0162819 A1 | 5/2019 | Schneider et al. | | |

FOREIGN PATENT DOCUMENTS

| | | | |
|---|---|---|---|
| EP | 3 489 712 A1 | 5/2019 | |
| WO | 2021/217216 A1 | 4/2021 | |
| WO | WO2021/175969 A1 * | 9/2021 | ....... H04B 10/25753 |

OTHER PUBLICATIONS

International Search Report and Written Opinion dated Jun. 14, 2023 issued by the International Searching Authority in related International Patent Application No. PCT/EP2023/058831; filed Apr. 4, 2023.

* cited by examiner

*Primary Examiner* — Bernarr E Gregory
(74) *Attorney, Agent, or Firm* — Gordon Rees Scully & Mansukhani, LLP (57) ABSTRACT

An exemplary embodiment of the invention relates to a radar system comprising a radar transmission unit, a radar reception unit, and a central unit which is connected to the radar transmission unit and the radar reception unit via optical fibers. Further exemplary embodiments of the invention relate to vehicles having radar systems as well as methods for generating radar information.

20 Claims, 10 Drawing Sheets

RADAR SYSTEM

The invention relates to a radar system comprising a radar transmission unit, a radar reception unit, and a central unit which is connected to the radar transmission unit and the radar reception unit.

BACKGROUND OF THE INVENTION

A radar system comprising a radar transmission unit, a radar reception unit and a central unit is described in the European Patent Application EP 3 489 712 A1.

Objective of the Present Invention

An objective of the present invention is to provide an improved radar system.

Another objective of the present invention is to provide a vehicle comprising an improved radar system.

Another objective of the present invention is to provide an improved method of generating a radar information.

BRIEF SUMMARY OF THE INVENTION

An exemplary embodiment of the present invention relates to a radar system comprising a radar transmission unit, a radar reception unit, and a central unit which is connected to the radar transmission unit and the radar reception unit,
  wherein the central unit comprises a signal generator configured to provide a periodic electrical base signal, wherein the frequency of the periodic electrical base signal continuously increases or decreases over time at least in a segment of each periodic cycle,
  wherein the central unit comprises a modulator configured to modulate the electrical base signal onto an optical carrier signal and transmit the modulated optical carrier signal to the radar transmission unit via a first optical fiber,
  wherein the radar transmission unit comprises an opto-electrical converter and a radar transmitter, wherein the opto-electrical converter is configured to receive the modulated optical carrier signal, convert it into an electrical radar driver signal and forward the electrical radar driver signal to the radar transmitter,
  wherein the radar reception unit comprises a radar receiver, a mixer, a filter and an optical modulator,
  wherein the mixer is electrically arranged between the radar receiver and the filter and mixes an electrical radar echo signal provided by the radar receiver with an electrical reference signal which is derived from an optical reference signal,
  wherein the optical reference signal is optically received from the central unit via a second optical fiber,
  wherein the filter filters the mixed signal and provides a filtered signal, said filter providing a second order high-pass filtering range,
  wherein the optical modulator modulates the filtered signal onto a second optical carrier signal and transmits the modulated second optical carrier signal to the central unit via a third optical fiber, and
  wherein the central unit further comprises a central opto-electrical converter and an evaluation unit, the opto-electrical converter being configured to convert the modulated second optical carrier signal into a corresponding electrical signal, and the evaluation unit being configured to evaluate the corresponding electrical signal and derive a radar information therefrom.

The second order high-pass filtering range provides a 40 dB/decade frequency response and may therefore compensate the decrease of the amplitude of reflected electromagnetic energy. The decrease is proportional to the distance raised to the power of 4:

$$P_{in} \sim 1/D^4$$

where D designates the distance between a reflecting object and the radar system and Pin designates the amplitude of the signal strength (power) of the received reflected radiation at the receiver's end. The second order high-pass filtering range may therefore compensate this physical effect.

The second optical carrier signal is preferably transmitted from the central unit to the radar reception unit via a fourth optical fiber.

The second optical carrier signal that is transmitted via said fourth optical fiber, is preferably an unmodulated optical signal. The unmodulated optical signal is preferably generated by a CW (continuous wave) laser of the central unit.

The electrical radar driver signal is preferably lagging behind the electrical reference signal by a given time-delay.

The electrical radar driver signal may be derived from the periodic electrical base signal of the electrical signal generator and may therefore be a first time-delayed version of the periodic electrical base signal.

The electrical reference signal may also derived from the periodic electrical base signal of the electrical signal generator and may therefore be a second time-delayed version of the periodic electrical base signal.

The first time-delayed version of the periodic electrical base signal preferably lags behind the second time-delayed version of the periodic electrical base signal.

The first optical fiber is preferably longer than the second optical fiber, the additional length of the first optical fiber causing the time-delay, or at least a part thereof, between the electrical radar driver signal and the electrical reference signal.

Said time-delay preferably causes a minimum frequency in the mixed signal.

The minimum frequency preferably falls within said second order high-pass filtering range.

The radar system is preferably configured to detect objects that are located in a predefined nominal distance range that is delimited by a predefined nominal minimum distance and a predefined nominal maximum distance.

The frequency of the periodic electrical base signal preferably varies over time in the form of a periodic ramp signal. The periodic ramp signal is preferably a linear periodic ramp signal.

The time-delay between the electrical radar driver signal and the electrical reference signal, and a slope of the linear ramp signal preferably fulfil the following equation:

$$(S \cdot (dT + 2 \cdot D_{min}/C)) > 1 \text{ Mhz}$$

wherein Dmin designates the predefined nominal minimum distance, dT the time delay, C the speed of light, and S the ramp's slope that defines the frequency change over time.

An upper limit of the second order high-pass filtering range preferably corresponds to a radar frequency response in the mixed signal that would be provoked by a detected object located at the nominal maximum distance.

The filter is preferably a high-pass filter having a 3 dB-cut-off frequency. The cut-off-frequency of the filter preferably corresponds to a radar frequency response in the mixed signal that would be provoked by a detected object located at the nominal maximum distance.

The filter is preferably a Butterworth filter.

The radar reception unit preferably comprises an amplifier that is arranged between the mixer and the optical modulator. The amplifier may amplify the filtered signal and generate an amplified signal.

The optical modulator is preferably a Mach-Zehnder-modulator which is controlled by the amplified signal.

The amplification of the amplifier is preferably limited such that the following condition is fulfilled:

$$V\text{in max}(f)/Vpi < 0.2$$

wherein Vinmax designates the maximum amplitude of the amplified signal and Vpi the voltage necessary to switch the optical output power of the Mach-Zehnder-modulator between on and off. If the above condition is met the radar system may provide a dynamic range of at least 30 dB.

Said condition is preferably fulfilled for all frequencies within said second-order high-pass filtering range of the filter.

The derivation of said radar information preferably includes generating one or more distance values indicating the distance of one or more detected objects.

A synchronization line may connect the signal generator and the evaluation unit and preferably conveys a sample-control signal that controls the frequency and phase of a sampling carried out by an A/D converter of the evaluation unit.

The opto-electrical converter of the radar transmission unit preferably comprises a frequency multiplying unit. The frequency multiplying unit is preferably configured to carry out a frequency multiplication during the reception of the modulated optical carrier signal or during the conversion of the received modulated optical carrier signal into the electrical radar driver signal, such that the electrical radar driver signal has a radar frequency that is a multiple of the frequency of the received modulated optical carrier signal.

The opto-electrical converter of the radar reception unit may also comprise a frequency multiplying unit. The latter frequency multiplying unit is preferably configured to carry out a frequency multiplication based on the same multiplication factor as does the opto-electrical converter of the radar transmission unit.

Each of the radar transmission unit, the radar reception unit, and the central unit is preferably a component that consists of or comprises at least one SOI (silicon on insulator)-based integrated photonic chip.

Another exemplary embodiment of the present invention relates to a vehicle having a radar system
  wherein the radar system comprises a radar transmission unit, a radar reception unit, and a central unit which is connected to the radar transmission unit and the radar reception unit,
  wherein the central unit comprises a signal generator configured to provide a periodic electrical base signal, wherein the frequency of the periodic electrical base signal continuously increases or decreases over time at least in a segment of each periodic cycle,
  wherein the central unit comprises a modulator configured to modulate the electrical base signal onto an optical carrier signal and transmit the modulated optical carrier signal to the radar transmission unit via a first optical fiber,
  wherein the radar transmission unit comprises an opto-electrical converter and a radar transmitter, wherein the opto-electrical converter is configured to receive the modulated optical carrier signal, convert it into an electrical radar driver signal and forward the electrical radar driver signal to the radar transmitter,
  wherein the radar reception unit comprises a radar receiver, a mixer, a filter and an optical modulator,
  wherein the mixer is electrically arranged between the radar receiver and the filter and mixes an electrical radar echo signal provided by the radar receiver with an electrical reference signal which is derived from an optical reference signal,
  wherein the optical reference signal is optically received from the central unit via a second optical fiber,
  wherein the filter filters the mixed signal and provides a filtered signal, said filter providing a second order high-pass filtering range,
  wherein the optical modulator modulates the filtered signal onto a second optical carrier signal and transmits the modulated second optical carrier signal to the central unit via a third optical fiber, and
  wherein the central unit further comprises a central opto-electrical converter and an evaluation unit, the opto-electrical converter being configured to convert the modulated second optical carrier signal into a corresponding electrical signal, and the evaluation unit being configured to evaluate the corresponding electrical signal and derive one or more distance values indicating the distance of one or more objects that are located in a predefined nominal distance range from the vehicle.

Another exemplary embodiment of the present invention relates to a method of generating a radar information,
  wherein a signal generator of a central unit provides a periodic electrical base signal such that the frequency of the periodic electrical base signal continuously increases or decreases over time at least in a segment of each periodic cycle,
  wherein a modulator of the central unit modulates the electrical base signal onto an optical carrier signal and transmits the modulated optical carrier signal to the radar transmission unit via a first optical fiber,
  wherein an opto-electrical converter of a radar transmission unit receives the modulated optical carrier signal and converts it into an electrical radar driver signal and forwards the electrical radar driver signal to the radar transmitter,
  wherein a mixer of the radar reception unit mixes a radar echo signal received by a radar receiver of the radar reception unit with an electrical reference signal which is optically received from the central unit via a second optical fiber,
  wherein a filter of the radar reception unit filters the mixed signal and provides a filtered signal, the filter providing a second order high-pass filtering range,
  wherein an optical modulator of the radar reception unit modulates the filtered signal onto a second optical carrier signal and transmits the modulated second optical carrier signal to the central unit via a third optical fiber, and
  wherein an opto-electrical converter of the central unit converts the modulated second optical carrier signal into a corresponding electrical signal, and
  wherein an evaluation unit of the central unit evaluates the corresponding electrical signal and derives a radar information therefrom.

The first optical fiber is longer than the second optical fiber, the additional length of the first optical fiber causing a time-delay, or at least a part thereof, between the electrical radar driver signal and the electrical reference signal, such that the electrical radar driver signal is lagging behind the electrical reference signal, wherein the time-delay causes a given minimum frequency in the mixed signal and wherein the additional length causes the minimum frequency to fall within said second order high-pass filtering range of said filter.

The frequency of the periodic electrical base signal is varied over time in the form of a periodic ramp signal.

A time-delay between the electrical radar driver signal and the electrical reference signal, and a slope of the ramp signal fulfils the following equation:

$$(S \cdot (dT + 2 \cdot D\ min/C)) > 1\ Mhz$$

wherein Dmin designates a predefined nominal minimum distance of a predefined nominal distance range, dT the time delay, C the speed of light, and S the ramp's slope that defines the frequency change over time.

The filter is preferably a high-pass filter (e.g. Butterworth filter) having a cut-off frequency.

The cut-off-frequency preferably corresponds to a radar frequency response in the mixed signal that would be provoked by a detected object located at a nominal maximum distance of a predefined nominal distance range.

An amplifier that is arranged between the mixer and the optical modulator, preferably amplifies the filtered signal and generates an amplified signal.

The optical modulator is preferably a Mach-Zehnder-modulator and controlled by the amplified signal.

The amplification of the amplifier is preferably limited such that the following condition is fulfilled:

$$Vin\ max(f)/Vpi < 0.2$$

wherein Vinmax designates the maximum amplitude of the amplified signal and Vpi the voltage necessary to switch the optical output power of the Mach-Zehnder-modulator between on and off, and wherein said condition is fulfilled for all frequencies f within said second-order high-pass filtering range of said filter.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENTS

The preferred embodiments of the present invention will be best understood by reference to the drawings. It will be readily understood that the present invention, as generally described and illustrated in the figures herein, could vary in a wide range. Thus, the following more detailed description of the exemplary embodiments of the present invention, as represented in the figures, is not intended to limit the scope of the invention, as claimed, but is merely representative of presently preferred embodiments of the invention.

Figure 1:
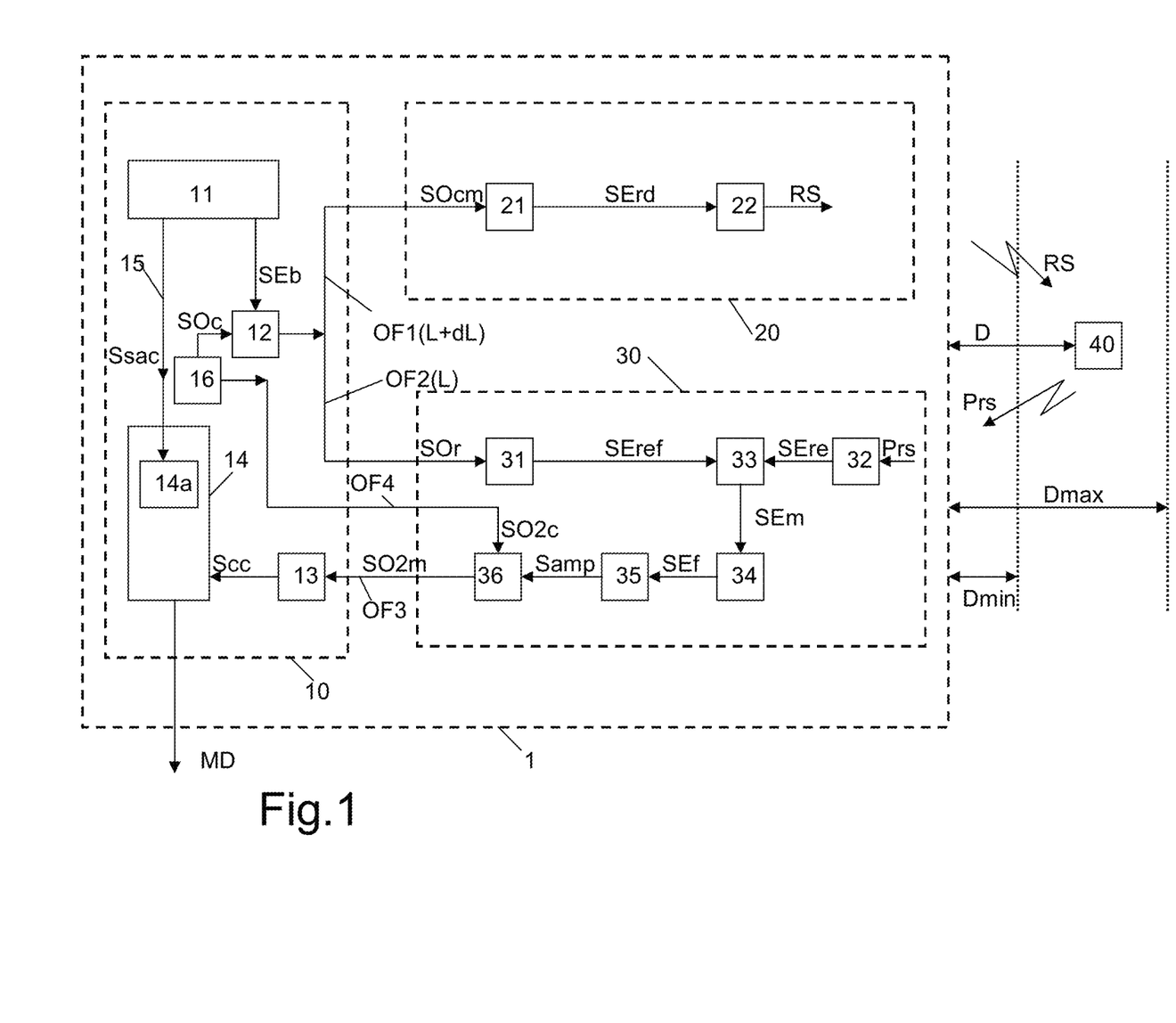
FIG. 1 illustrates a first exemplary embodiment of a radar system according to the present invention.

FIG. 1 depicts a first exemplary embodiment of a radar system 1 according to the present invention. The radar system 1 is capable of detecting objects 40.

The radar system 1 of FIG. 1 is designed to generate distance values MD with respect to detected objects 40 that are located in a predefined nominal distance range. The distance range is delimited by a predefined nominal minimum distance Dmin and a predefined nominal maximum distance Dmax.

The radar system 1 comprises a central unit 10, a radar transmission unit 20 and a radar reception unit 30.

The central unit 10 is connected to the radar transmission unit 20 via a first optical fiber OF1, and connected to the radar reception unit 30 via a second optical fiber OF2, a third optical fiber OF3 and a fourth optical fiber OF4.

The central unit 10 of FIG. 1 comprises a signal generator 11, a central modulator 12, a central opto-electrical converter 13, an evaluation unit 14, a synchronization line 15, and a laser 16.

The radar transmission unit 20 of FIG. 1 comprises an opto-electrical converter 21 and a radar transmitter 22. The radar reception unit 30 of FIG. 1 comprises an opto-electrical converter 31, a radar receiver 32, a mixer 33, a filter 34, an amplifier 35 and an optical modulator 36.

In the exemplary exemplary embodiment of FIG. 1, both an electrical radar driver signal SErd and an electrical reference signal SEref are derived from the same periodic electrical base signal SEb of the same electrical signal generator 11.

The length L+dL of first optical fiber OF1 is larger than the length L of the second optical fiber OF2. The additional length dL of the first optical fiber OF1 causes a time-delay dT (see FIG. 2) between the electrical radar driver signal SErd and the electrical reference signal SEref. In other words, the electrical radar driver signal SErd always lags behind the electrical reference signal SEref.

The additional length dL is preferably in the range between 5 and 25 m.

Figure 2:
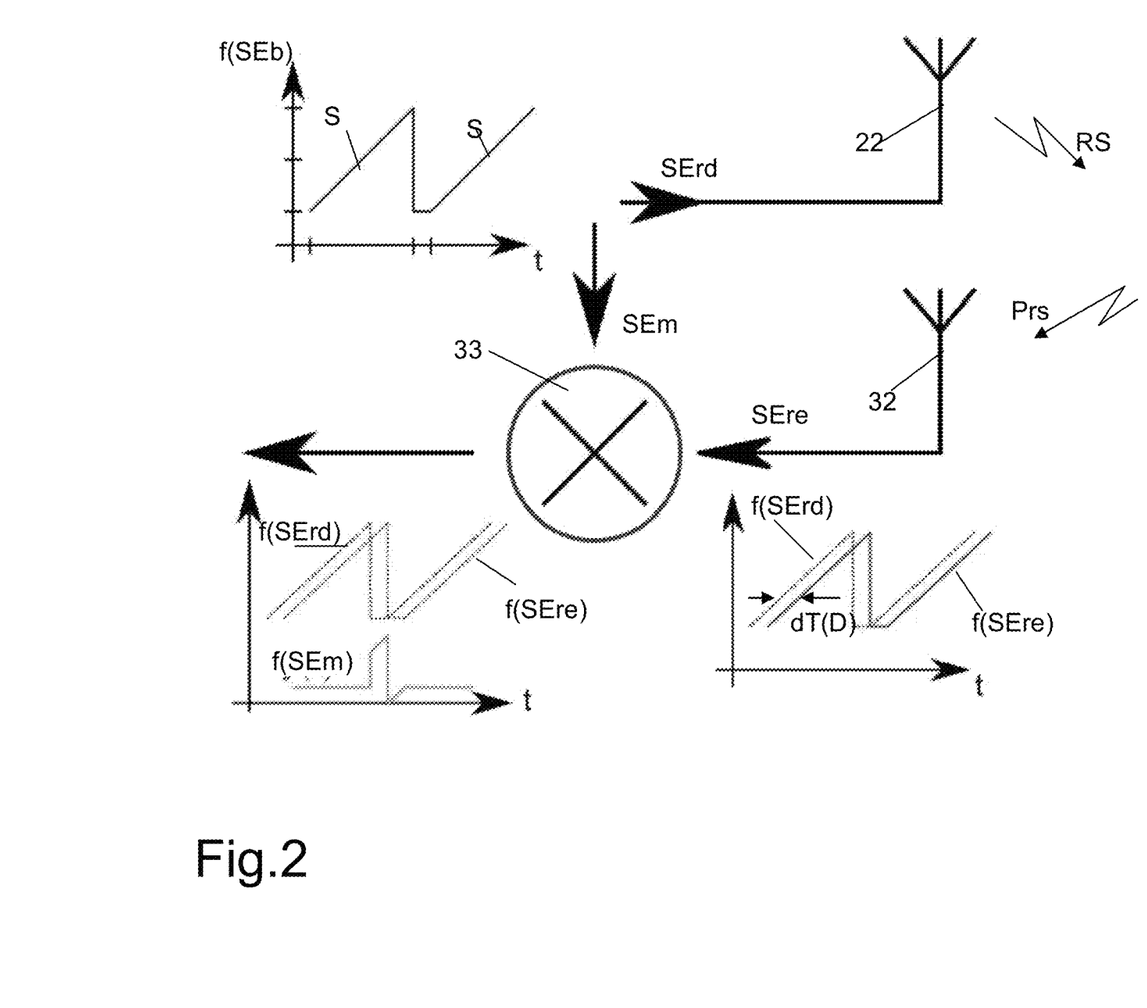
FIGS. 2-7 illustrate an exemplary operation of the radar system of FIG. 1.

The time-delay dT causes a minimum frequency of a mixed signal SEm even if a reflecting object 40 is directly located (D=0) in front of the radar system 1 and reflects the electromagnetic radiation without additional delay (see dT(D) in FIG. 2).

The time-delay dT is preferably in the range between 20 ns and 120 ns.

The radar system 1 of FIG. 1 preferably operates as follows:

The signal generator 11 provides a periodic electrical base signal SEb. The frequency of the periodic electrical base signal SEb continuously increases or decreases over time at least in a segment of each periodic cycle. The frequency f of the periodic electrical base signal SEb preferably varies over time t in the form of a linear periodic ramp that is characterized by a slope S (see FIG. 2).

The above mentioned time-delay dT between the electrical radar driver signal SErd and the electrical reference signal SEref, and the slope S of the linear ramp signal fulfil the following equation:

$$(S \cdot (dT + 2 \cdot D\ min/C)) > df\ min$$

wherein Dmin designates the predefined nominal minimum distance, dT the time delay that is caused by the additional length dL of the first optical fiber OF1 with respect to the second optical fiber OF2, C the speed of light, S the ramp's slope that defines the frequency change over time, and dfmin a given minimal frequency change.

dfmin is preferably at least 1 MHz in order to accurately identify objects 40 even in case of noise.

In other words, the slope S of the ramp and the length difference dL between the first and second optical fiber OF1 and OF2 are correlated in order to provide a sufficient frequency change even for small distances between the radar system 10 and the object 40, thus enabling the radar system 10 to properly function even for small minimum distance values Dmin.

The central modulator 12 modulates the electrical base signal SEb onto an optical carrier signal SOc and transmits the modulated optical carrier signal SOcm to the radar transmission unit 20 via the first optical fiber OF1.

The radar system 1 is preferably a FMCW (frequency-modulated continuous wave) radar system. The optical carrier signal SOc is preferably unmodulated and the laser 16 is preferably a CW (continuous wave) laser.

The opto-electrical converter 21 receives the modulated optical carrier signal SOcm from the central modulator 12 and converts it into the electrical radar driver signal SErd. The electrical radar driver signal SErd is forwarded to the radar transmitter 22 that generates an outgoing electromagnetic radar signal RS.

A portion Prs of the electromagnetic radar signal RS may be reflected by the object 40. The reflected portion Prs of the radar signal RS returns to the radar reception unit 30.

The radar receiver 32 of the radar reception unit 30 receives the reflected portion Prs and generates an electrical radar echo signal SEre. FIG. 2 visualizes the time delay dT(D) between the electrical radar driver signal SErd and the electrical radar echo signal SEre. The time delay dT(D) describes the distance D of reflecting objects 40 and always exceeds the minimum delay caused by the different fiber lengths L and L+dL.

The mixer 33 mixes the electrical radar echo signal SEre with the electrical reference signal SEref that is derived from an optical reference signal SOr. The optical reference signal SOr is optically received from the central unit 10 via the second optical fiber OF2, and converted into the electrical reference signal SEref by the opto-electrical converter 31 of the radar reception unit 30.

FIG. 2 depicts the frequency f of the mixed signal SEm over time t in an exemplary fashion. The frequency f of the mixed signal SEm depends from the time delay dT(D) and describes the distance D of the reflecting object 40. The distance values MD can therefore be derived from the frequency f of the mixed signal SEm.

Figure 3:
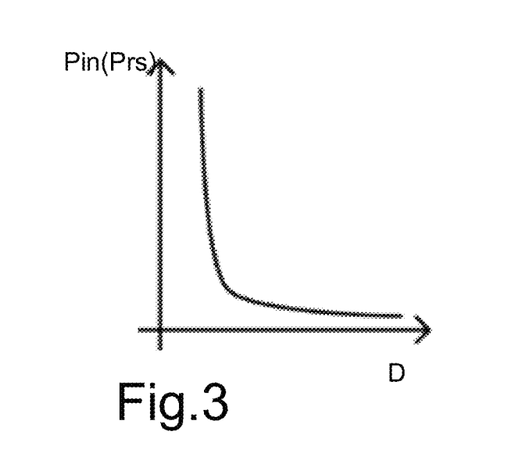

When the distance D of the reflecting object 40 from the radar system 1 increases, the amplitude of the reflected portion Prs of the electromagnetic radar signal RS decreases. The decrease is proportional to the distance D raised to the power of 4:

$$Pin \sim 1/D^4$$

where D designates the distance between the reflecting object 40 and the radar system 1 and Pin designates the amplitude of the signal strength (power) of the received reflected radiation at the receiver's end (see FIG. 3).

Figure 4:
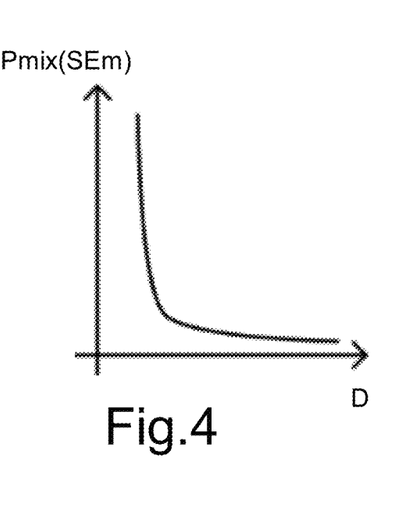

FIG. 4 depicts the amplitude Pmix of the signal strength (power) of the mixed signal SEm that is outputted by the mixer 33, versus the distance D.

Figure 5:
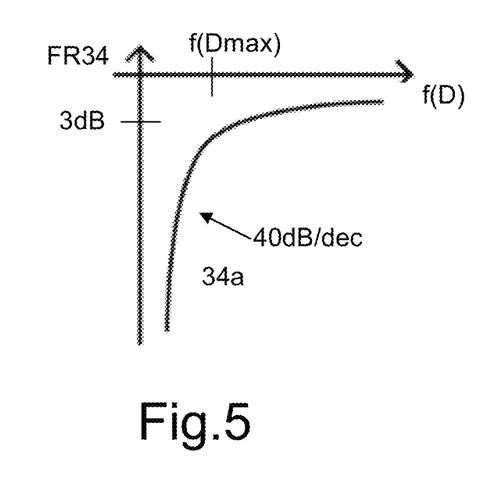

FIG. 5 depicts the frequency response FR34 of the filter 34 versus the frequency f and therefore versus the distance D.

In order to cope with the decrease of the amplitude Pmix of the mixed signal SEm, the filter 34 provides a second order high-pass filtering range 34a. In the second order high-pass filtering range 34a the frequency response increases with 40 dB per decade.

The filter 34 may be a high-pass filter 34 having a 3 dB-cut-off frequency. The 3 dB-cut-off-frequency corresponds to a radar frequency response of the mixed signal SEm that would be provoked by a reflecting object 40 located at the nominal maximum distance Dmax.

The minimum frequency in the mixed signal SEm that would be provoked by a reflecting object 40 located at the nominal minimum distance Dmin, falls within the second order high-pass filtering range 34a of the filter 34.

Figure 6:
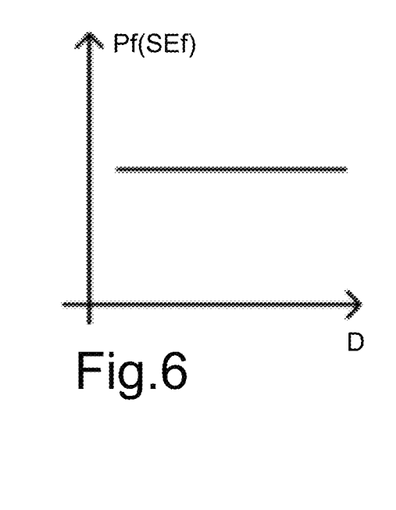

FIG. 6 depicts in an exemplary fashion the amplitude Pf of the signal strength (power) of the filtered signal SEf that is outputted by the filter 34. Due to the second order high-pass filter characteristic, the filter 34 flattens the frequency response and compensates the $1/D^4$-signal decrease of the amplitude Pin of the received reflected radiation.

In other words, the amplitude Pf of the filtered signal SEf is approximately independent from the object's distance D from the radar system 1.

After mixing, the amplifier 35 amplifies the mixed signal SEm.

In the exemplary embodiment of FIG. 1, the optical modulator 36 is a Mach-Zehnder-modulator, which is controlled by the amplified signal Samp of the amplifier 35.

The Mach-Zehnder-modulator modulates the amplified signal Samp onto a second optical carrier signal SO2c and transmits the modulated second optical carrier signal SO2m to the central unit 10 via the third optical fiber OF3.

The second optical carrier signal SO2c is preferably unmodulated and may be delivered by the laser 16 of the central unit 10 via the fourth optical fiber OF4. In other words, the optical carrier signal SOc and the second optical carrier signal SO2c may origin from the same source.

In order to achieve a measurement range of at least a factor of 100 between the maximum distance Dmax and the minimum distance Dmin (e.g. Dmax=100 m and Dmin=1 m), the amplification of the amplifier 35 is limited such that the following condition is fulfilled:

$$Vin\ max(f)/Vpi < 0.2$$

Vinmax designates the maximum amplitude of the amplified signal Samp and Vpi designates the voltage necessary to switch the optical output power of the Mach-Zehnder-modulator between on and off. The latter condition is preferably fulfilled for all frequencies f within said second-order high-pass filtering range 34a of the filter 34 or at least for all frequencies f which correspond to distances of the object 40 between the minimum distance Dmin and the maximum distance Dmax.

If the above condition Vinmax(f)/Vpi<0.2 is met, 3rd-order harmonic distortions caused by the non-linear modulation characteristic of the Mach-Zehnder-modulator remain below a threshold of −40 dB compared to the amplitude of the modulated second optical carrier signal SO2c.

Therefore, the above condition Vinmax(f)/Vpi<0.2 allows a dynamic range of the radar system 1 of at least 30 dB. The dynamic range takes into account that objects differ in their reflection properties such that some close objects may reflect less radiation than some other remote objects. In other words the radar system 1 may cope with a wide reflection range of at least up to 30 dB if above condition Vinmax(f)/Vpi<0.2 is met.

For receiving and processing the modulated second optical carrier signal SO2cm, the central unit 10 comprises the central opto-electrical converter 13 and the evaluation unit 14. The central opto-electrical converter 13 receives the modulated second optical carrier signal SO2cm and generates a corresponding converted signal Scc. The evaluation unit 14 evaluates the latter converted signal Scc and derives a radar information therefrom. For instance, the derivation of the radar information may include generating one or more distance values MD indicating the distance of one or more detected objects 40.

The distance values MD may be calculated as follows:

$$MD=f(f(Scc))$$

wherein f(f(Scc)) describes a function that correlates the frequency of the converted signal Scc (and therefore the frequency of the mixed signal SEm) with the corresponding distance value D(f(SEm)). The function f(f(Scc)) depends on the slope S of the electrical base signal SEb and the difference dL between the length of the first optical fiber OF1 and the length of the second optical fiber OF2.

Figure 7:
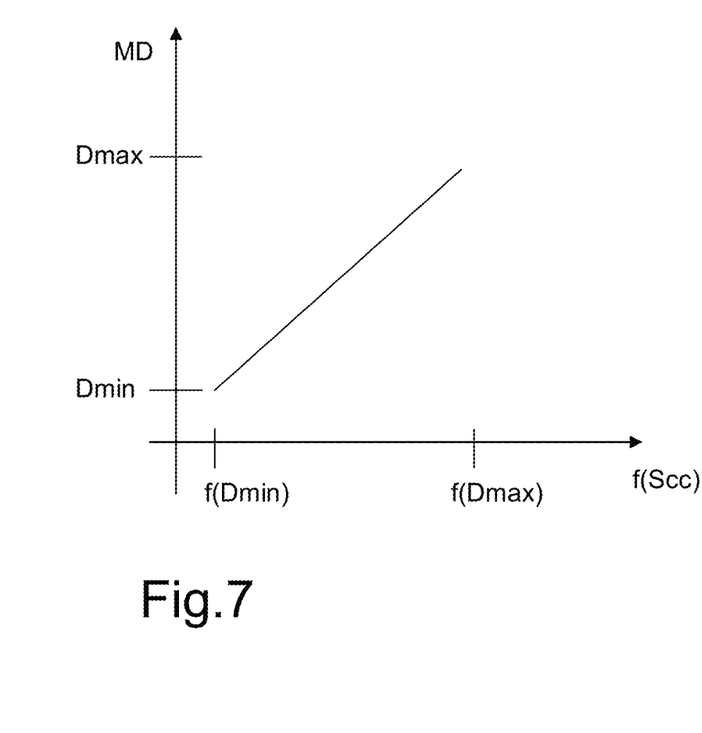

FIG. 7 depicts an exemplary embodiment of f(f(SEm)).

The evaluation unit 14 preferably comprises an A/D converter 14a that is connected via the synchronization line 15 with the signal generator 11. The synchronization line 15 conveys a sample-control signal Ssac that controls the frequency and phase of a sampling carried out by the A/D converter 14a of the evaluation unit 14. The sample-control signal Ssac is preferably synchronized with the phase of the electrical base signal SEb.

Figure 8:
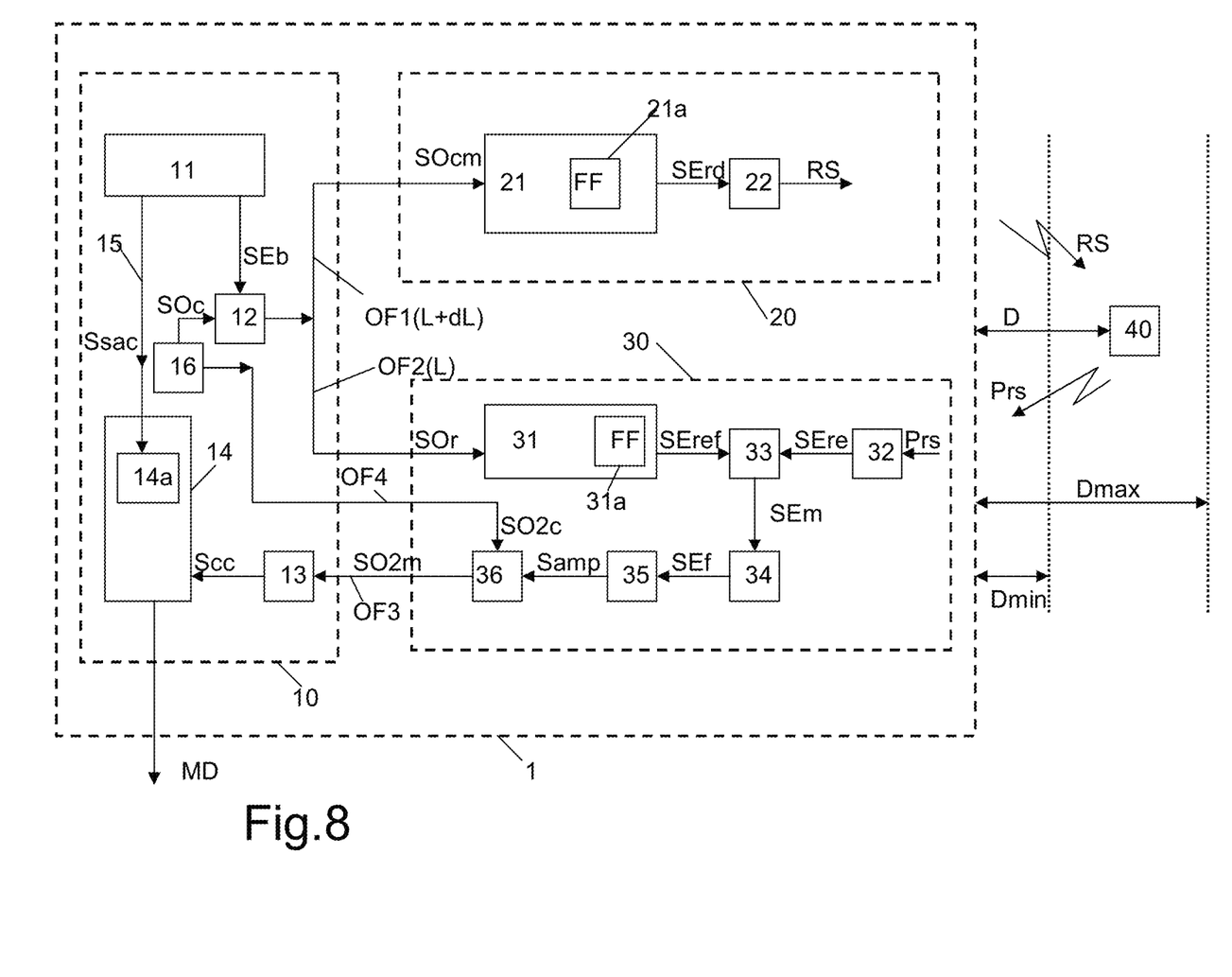
FIG. 8 illustrates a second exemplary embodiment of a radar system according to the present invention.

FIG. 8 depicts a second exemplary embodiment of a radar system 1 according to the present invention.

The opto-electrical converter 21 of the radar transmission unit 20 of FIG. 8 comprises a frequency multiplication unit 21a that increases the frequency of the electrical radar driver signal SErd and the outgoing electromagnetic radar signal RS by a factor FF. The factor FF preferably equals 4.

The opto-electrical converter 31 of the reception unit 30 of FIG. 8 comprises a similar frequency multiplication unit 31a that increases the frequency of the output signal of the opto-electrical converter 31 by the same factor FF. Therefore, the frequency multiplications of the frequency multiplication units 21a and 31a do not influence the mixed signal SEm.

An advantage of the embodiment of FIG. 2 is that the frequency of the electrical base signal SEb may be much smaller than the frequency of the outgoing electromagnetic radar signal RS. For instance, the frequency of the electromagnetic radar signal RS may vary between 76 and 81 GHz whereas the frequency of the electrical base signal SEb may vary only between 19 and 20.25 GHz. Alternatively, other frequency bands may be chosen.

The frequency f(SEb) of the periodic electrical base signal SEb of the signal generator 11 may for instance increase in each cycle from 19 GHz to 19.23 GHz in 18.125 ns. Alternatively, other frequency ramp rates may be chosen.

Figure 9:
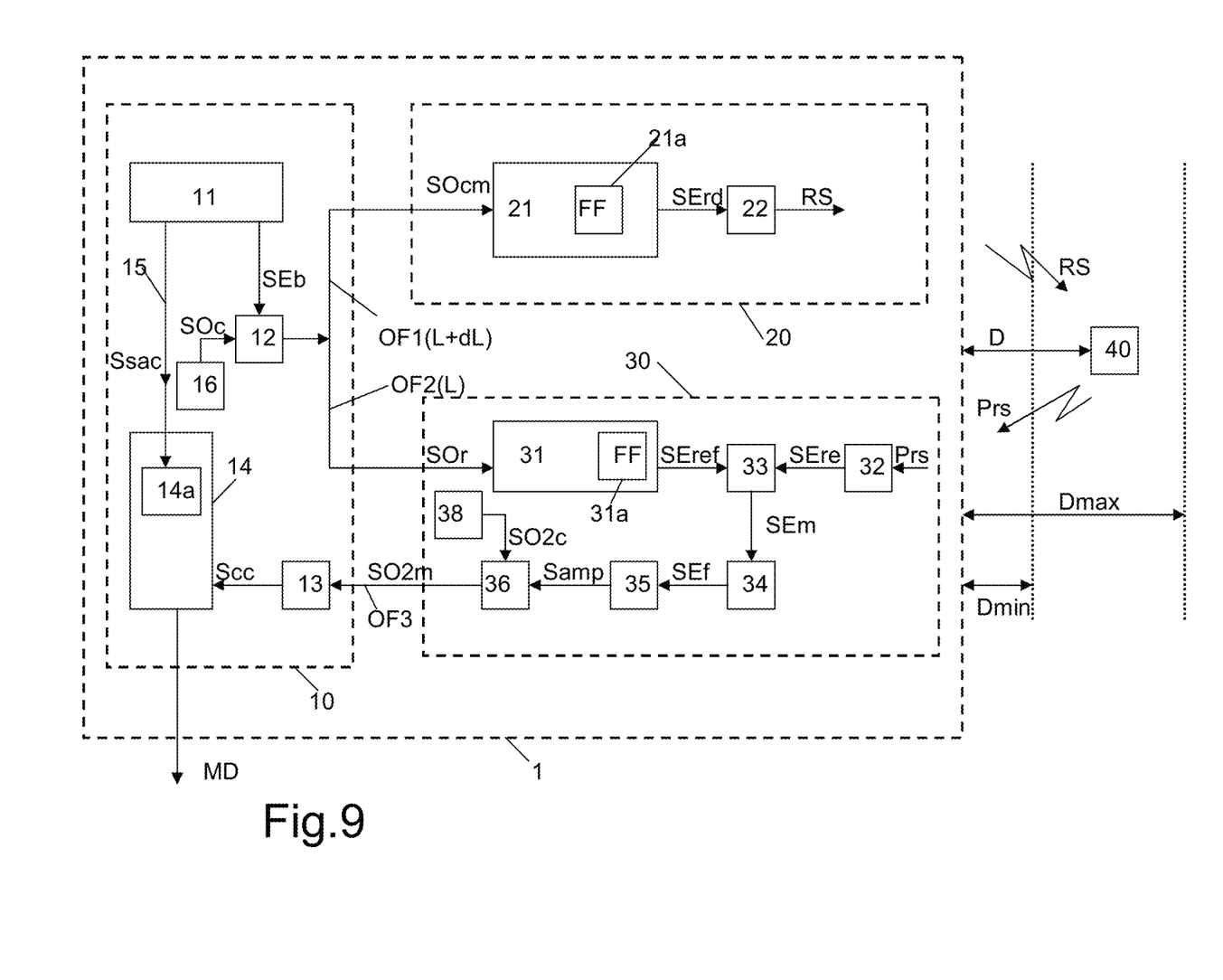
FIG. 9 illustrates a third exemplary embodiment of a radar system according to the present invention.

FIG. 9 depicts a third exemplary embodiment of a radar system 1 according to the present invention. The radar reception unit 30 of the radar system 1 of FIG. 9 comprises an own laser 38 for generating the second unmodulated optical carrier signal SO2c. The fourth fiber OF4 can therefore be omitted.

The radar systems 1 as shown in and described with reference to FIGS. 1-9 are not restricted to a single radar transmission unit 20 and a single radar reception unit 30. Instead, the radar systems 1 as shown in and described with reference to FIGS. 1-9 may comprise a plurality of radar transmission units 20 and a plurality of radar reception units 30 which are connected to the central unit 10. The number NT of radar transmission units 20 and the number NR of radar reception units 30 do not need to be equal (e.g. NT>NR or NR>NT). For instance, one or more radar transmission units 20 may be assigned to the same radar reception unit 30, and/or one or more radar reception units 30 may be assigned to the same radar transmission unit 20.

Figure 10:
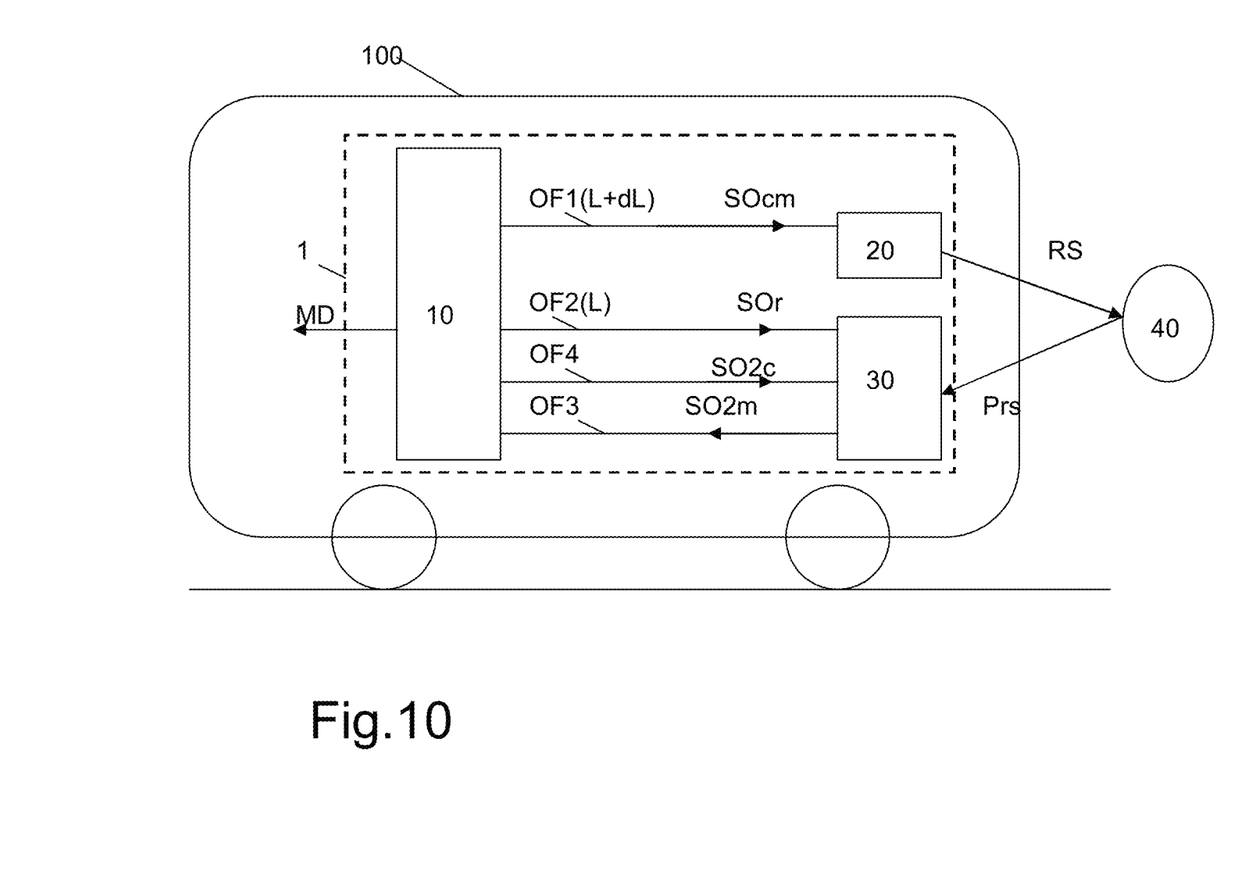
FIG. 10 illustrates an exemplary embodiment of a vehicle according to the present invention.

FIG. 10 depicts an exemplary embodiment of a vehicle 100 which comprises a radar system 1 according to FIG. 1 or 8.

The radar transmission unit 20 and the radar reception unit 30 are preferably located at the outer perimeter of the vehicle. The central unit 10 may be located anywhere within the vehicle 100.

Figure 11:
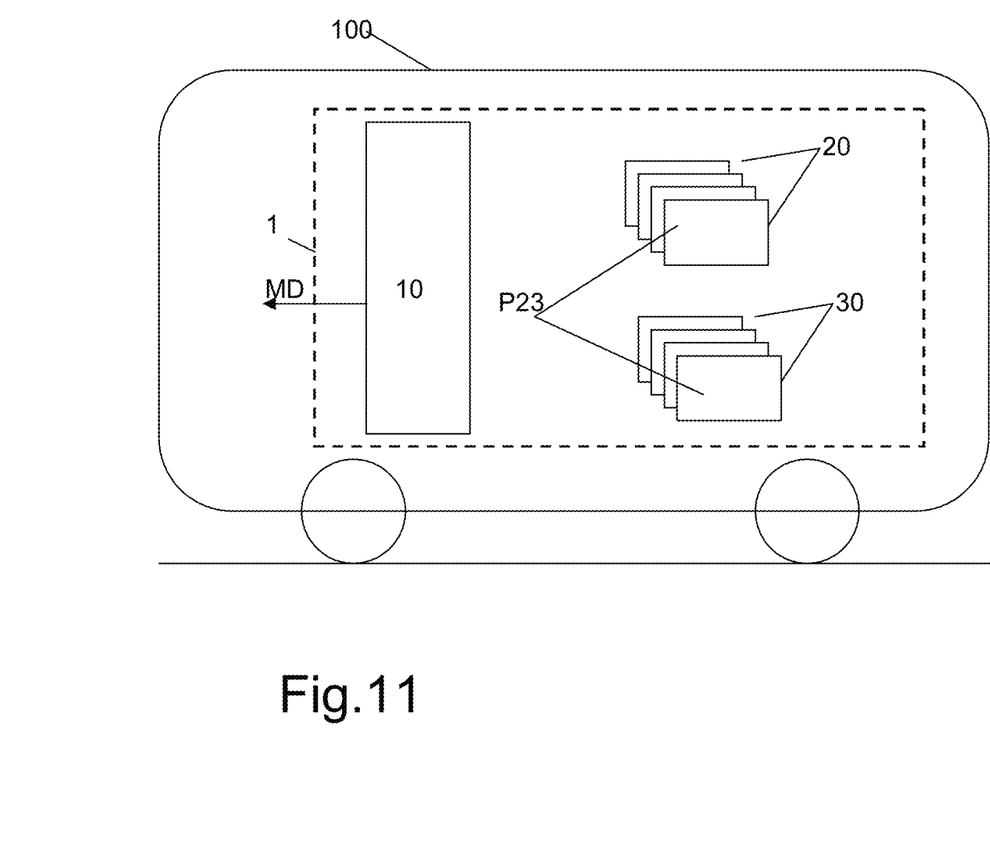
FIGS. 11-13 illustrate other exemplary embodiments of a vehicle according to the present invention.

FIG. 11 depicts another exemplary embodiment of a vehicle 10 according to the present invention. The radar system 1 of FIG. 11 comprises a plurality of transmission-reception pairs P23. Each of the radar transmission units 20 is individually assigned to a corresponding radar reception unit 30 in order to form one of the transmission-reception pairs P23. The transmission-reception pairs P23 are preferably connected to the same central unit 10 via fibers which are not depicted in FIG. 11. The central unit 10 cooperates with each of the transmission-reception pairs P23 as described above with reference to FIGS. 1-10.

The radar system 1 of FIG. 11 is not restricted to transmission-reception pairs P23 as shown in FIG. 11. Instead, the number NT of radar transmission units 20 and the number NR of radar reception units 30 may differ (e.g. NT>NR or NR>NT).

Figure 12:
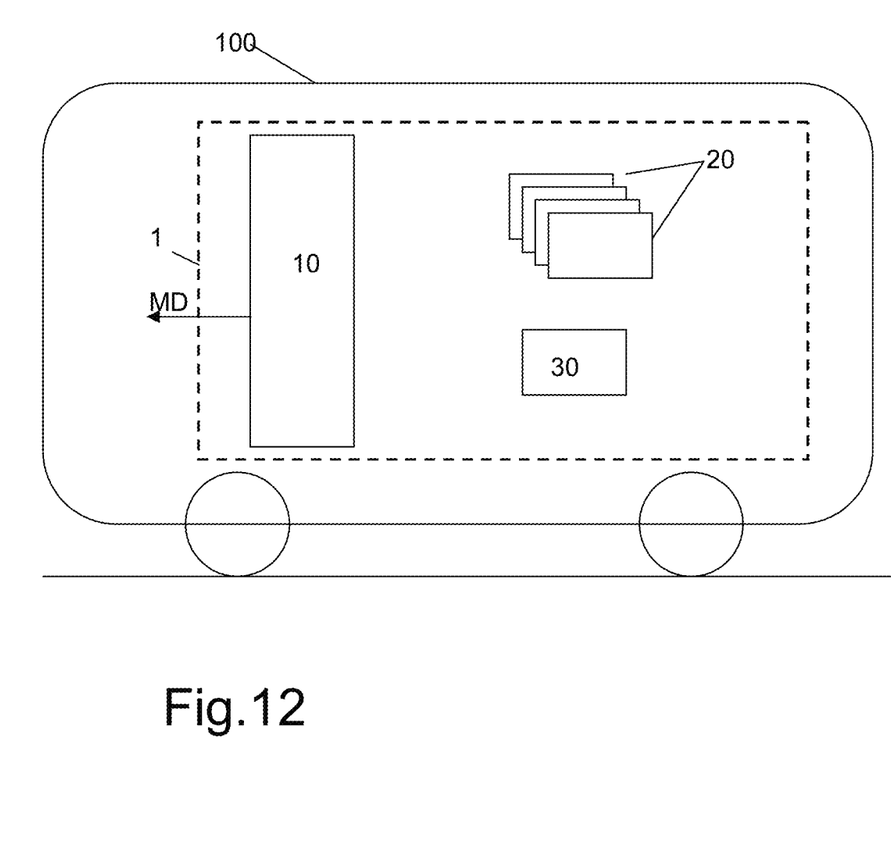
Figure 13:
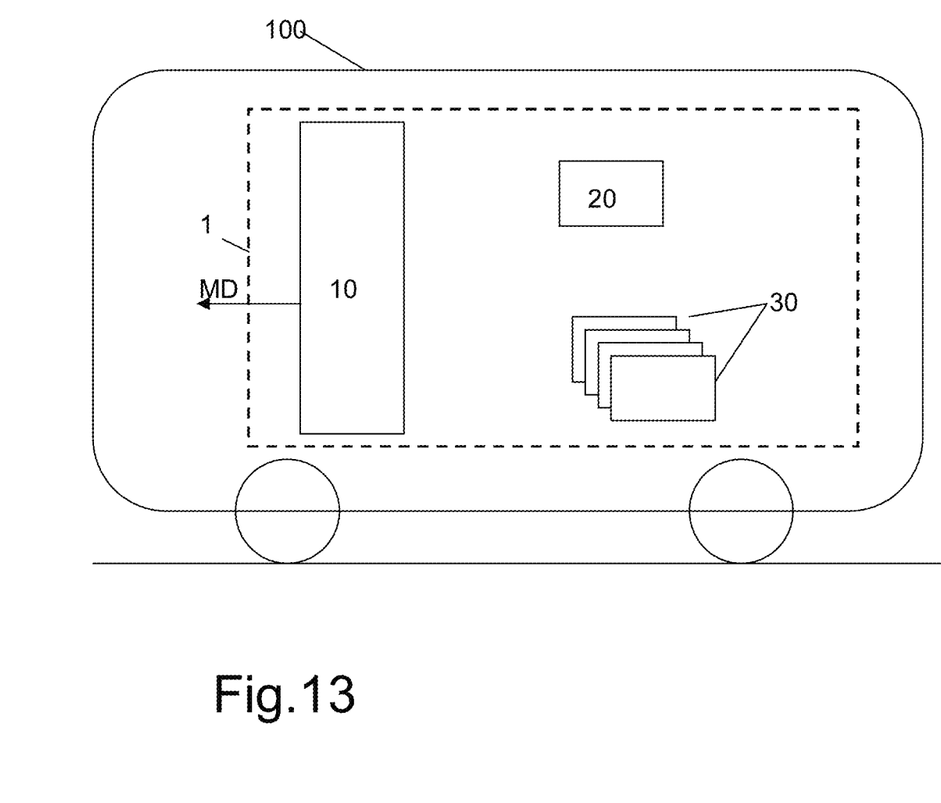

For instance, one or more radar transmission units 20 may be assigned to the same radar reception unit 30 (see FIG. 12), and/or one or more radar reception units 30 may be assigned to the same radar transmission unit 20 (see FIG. 13).

The central unit 10 is preferably designed to generate distance values MD for each of the reception units 30 if objects are detected in the predefined nominal distance range of the respective reception unit 30.

The various embodiments and aspects of embodiments of the invention disclosed herein are to be understood not only in the order and context specifically described in this specification, but to include any order and any combination thereof. Whenever the context requires, all words used in the singular number shall be deemed to include the plural and vice versa. Whenever the context requires, all options that are listed with the word "and" shall be deemed to include the word "or" and vice versa, and any combination thereof.

In the drawings and specification, there have been disclosed a plurality of embodiments of the present invention. The applicant would like to emphasize that each feature of each embodiment may be combined with or added to any other of the embodiments to modify the respective embodiment and create additional embodiments. These additional embodiments form a part of the present disclosure and, therefore, the applicant may file further patent claims regarding these additional embodiments at a later stage of the prosecution.

Further, the applicant would like to emphasize that each feature of each of the following dependent claims may be combined with any of the present independent claims as well as with any other (one ore more) of the present dependent claims (regardless of the present claim structure). Therefore, the applicant may direct further patent claims towards other claim combinations at a later stage of the prosecution.

In other words each of the dependent claims may refer to any other dependent claim regardless of the current claim structure and the order in which the dependent claims are listed below.

REFERENCE SIGNS 1 radar system
10 central unit
11 signal generator
12 central modulator
13 central opto-electrical converter
14 evaluation unit
14a A/D converter
15 synchronization line
16 laser
20 radar transmission unit
21 opto-electrical converter
21a frequency multiplication unit
22 radar transmitter
30 radar reception unit
31 opto-electrical converter
31a opto-electrical converter
32 radar receiver
33 mixer
34 filter
34a second order high-pass filtering range
35 amplifier
36 optical modulator
38 laser
40 object
100 vehicle
D distance
dL additional length
dT time delay
Dmin nominal minimum distance
Dmax nominal maximum distance
f frequency
FF factor
FR frequency response
L length of the second optical fiber
L+dL length of the first optical fiber
MD distance value
OF1 first optical fiber
OF2 second optical fiber
OF3 third optical fiber
OF4 fourth optical fiber
Pf amplitude
Pmix amplitude
P23 transmission-reception pair
Prs portion
RS electromagnetic radar signal
S slope
Samp amplified signal
Scc corresponding converted signal
SEb periodic electrical base signal
SEf filtered signal
SEm mixed signal
SErd electrical radar driver signal
SEre electrical radar echo signal
SEref electrical reference signal
SO2c second optical carrier signal
SO2cm modulated second optical carrier signal
SOc optical carrier signal
SOcm modulated optical carrier signal
SOr optical reference signal
Ssac sample-control signal
t time

The invention claimed is:

1. A radar system comprising a radar transmission unit, a radar reception unit, and a central unit which is connected to the radar transmission unit and the radar reception unit,
wherein the central unit comprises a signal generator configured to provide a periodic electrical base signal, wherein the frequency of the periodic electrical base signal continuously increases or decreases over time at least in a segment of each periodic cycle,
wherein the central unit comprises a modulator configured to modulate the electrical base signal onto an optical carrier signal and transmit the modulated optical carrier signal to the radar transmission unit via a first optical fiber,
wherein the radar transmission unit comprises an opto-electrical converter and a radar transmitter, wherein the opto-electrical converter is configured to receive the modulated optical carrier signal, convert it into an electrical radar driver signal and forward the electrical radar driver signal to the radar transmitter,
wherein the radar reception unit comprises a radar receiver, a mixer, a filter and an optical modulator,
wherein the mixer is electrically arranged between the radar receiver and the filter and mixes an electrical radar echo signal provided by the radar receiver with an electrical reference signal which is derived from an optical reference signal,
wherein the optical reference signal is optically received from the central unit via a second optical fiber,
wherein the filter filters the mixed signal and provides a filtered signal, said filter providing a second order high-pass filtering range,
wherein the optical modulator modulates the filtered signal onto a second optical carrier signal and transmits the modulated second optical carrier signal to the central unit via a third optical fiber, and
wherein the central unit further comprises a central opto-electrical converter and an evaluation unit, the opto-electrical converter being configured to convert the modulated second optical carrier signal into a corresponding electrical signal, and the evaluation unit being configured to evaluate the corresponding electrical signal and derive a radar information therefrom.

2. Radar system of claim 1
wherein the second optical carrier signal is transmitted from the central unit to the radar reception unit via a fourth optical fiber.

3. Radar system of claim 2
wherein the second optical carrier signal that is transmitted via said fourth optical fiber, is an unmodulated optical signal.

4. Radar system of claim 1
wherein the electrical radar driver signal is lagging behind the electrical reference signal by a given time-delay.

5. Radar system of claim 4
wherein the electrical radar driver signal is derived from the periodic electrical base signal of the electrical signal generator and therefore a first time-delayed version of the periodic electrical base signal,
wherein the electrical reference signal is also derived from the periodic electrical base signal of the electrical signal generator and therefore a second time-delayed version of the periodic electrical base signal, and wherein the first time-delayed version of the periodic electrical base signal lags behind the second time-delayed version of the periodic electrical base signal.

6. Radar system of claim 4 wherein
the first fiber is longer than the second fiber, the additional length of the first fiber causing the time-delay, or at least a part thereof, between the electrical radar driver signal and the electrical reference signal.

7. Radar system of claim 4
wherein the time-delay causes a minimum frequency in the mixed signal and
wherein the minimum frequency falls within said second order high-pass filtering range.

8. Radar system of claim 1
wherein the radar system is configured to detect objects that are located in a predefined nominal distance range that is delimited by a predefined nominal minimum distance and a predefined nominal maximum distance.

9. Radar system of claim 8
wherein the frequency of the periodic electrical base signal varies over time in the form of a linear periodic ramp signal.

10. Radar system of claim 9
wherein a time-delay between the electrical radar driver signal and the electrical reference signal, and a slope of the linear ramp signal fulfil the following equation:

$$(S \cdot (dT + 2 \cdot D\,min/C)) > 1\ \text{Mhz}$$

wherein Dmin designates the predefined nominal minimum distance, dT the time delay, C the speed of light, and S the ramp's slope that defines the frequency change over time.

11. Radar system of claim 1
wherein the radar system is configured to detect objects that are located in a predefined nominal distance range that is delimited by a predefined nominal minimum distance and a predefined nominal maximum distance, and
wherein an upper limit of the second order high-pass filtering range corresponds to a radar frequency response in the mixed signal that would be provoked by a detected object located at the nominal maximum distance.

12. Radar system of claim 1
wherein the filter is a high-pass filter having a 3 dB-cut-off frequency.

13. Radar system of claim 12
wherein the radar system is configured to detect objects that are located in a predefined nominal distance range that is delimited by a predefined nominal minimum distance and a predefined nominal maximum distance, and
wherein the cut-off-frequency corresponds to a radar frequency response in the mixed signal that would be provoked by a detected object located at the nominal maximum distance.

14. Radar system of claim 1
wherein the radar reception unit comprises an amplifier that is arranged between the mixer and the optical modulator, the amplifier amplifying the filtered signal and generating an amplified signal,
wherein the optical modulator is a Mach-Zehnder-modulator, which is controlled by the amplified signal, and
wherein the amplification of the amplifier is limited such that the following condition is fulfilled:

$$V\text{in max}(f)/Vpi < 0.2$$

wherein Vinmax designates the maximum amplitude of the amplified signal and Vpi the voltage necessary to switch the optical output power of the Mach-Zehnder-modulator between on and off, and
wherein said condition is fulfilled for all frequencies f within said second-order high-pass filtering range of the filter.

15. Vehicle having a radar system
wherein the radar system comprises a radar transmission unit, a radar reception unit, and a central unit which is connected to the radar transmission unit and the radar reception unit,
wherein the central unit comprises a signal generator configured to provide a periodic electrical base signal, wherein the frequency of the periodic electrical base signal continuously increases or decreases over time at least in a segment of each periodic cycle,
wherein the central unit comprises a modulator configured to modulate the electrical base signal onto an optical carrier signal and transmit the modulated optical carrier signal to the radar transmission unit via a first optical fiber,
wherein the radar transmission unit comprises an opto-electrical converter and a radar transmitter, wherein the opto-electrical converter is configured to receive the modulated optical carrier signal, convert it into an electrical radar driver signal and forward the electrical radar driver signal to the radar transmitter,
wherein the radar reception unit comprises a radar receiver, a mixer, a filter and an optical modulator,
wherein the mixer is electrically arranged between the radar receiver and the filter and mixes an electrical radar echo signal provided by the radar receiver with an electrical reference signal which is derived from an optical reference signal,
wherein the optical reference signal is optically received from the central unit via a second optical fiber,
wherein the filter filters the mixed signal and provides a filtered signal, said filter providing a second order high-pass filtering range,
wherein the optical modulator modulates the filtered signal onto a second optical carrier signal and transmits the modulated second optical carrier signal to the central unit via a third optical fiber, and
wherein the central unit further comprises a central opto-electrical converter and an evaluation unit, the opto-electrical converter being configured to convert the modulated second optical carrier signal into a corresponding electrical signal, and the evaluation unit being configured to evaluate the corresponding electrical signal and derive one or more distance values indicating the distance of one or more objects that are located in a predefined nominal distance range from the vehicle.

16. Method of generating a radar information,
wherein a signal generator of a central unit provides a periodic electrical base signal such that the frequency of the periodic electrical base signal continuously increases or decreases over time at least in a segment of each periodic cycle,
wherein a modulator of the central unit modulates the electrical base signal onto an optical carrier signal and transmits the modulated optical carrier signal to the radar transmission unit via a first optical fiber,
wherein an opto-electrical converter of a radar transmission unit receives the modulated optical carrier signal and converts it into an electrical radar driver signal and forwards the electrical radar driver signal to the radar transmitter, wherein a mixer of the radar reception unit mixes a radar echo signal received by a radar receiver of the radar reception unit with an electrical reference signal which is optically received from the central unit via a second optical fiber, wherein a filter of the radar reception unit filters the mixed signal and provides a filtered signal, the filter providing a second order high-pass filtering range, wherein an optical modulator of the radar reception unit modulates the filtered signal onto a second optical carrier signal and transmits the modulated second optical carrier signal to the central unit via a third optical fiber, and wherein an opto-electrical converter of the central unit converts the modulated second optical carrier signal into a corresponding electrical signal, and wherein an evaluation unit of the central unit evaluates the corresponding electrical signal and derives a radar information therefrom.

17. Method of claim 16 wherein the first fiber is longer than the second fiber, the additional length of the first fiber causing a time-delay, or at least a part thereof, between the electrical radar driver signal and the electrical reference signal, such that the electrical radar driver signal is lagging behind the electrical reference signal, wherein the time-delay causes a given minimum frequency in the mixed signal and wherein the additional length causes the minimum frequency to fall within a said second order high-pass filtering range of said filter.

18. Method of claim 16 wherein the frequency of the periodic electrical base signal is varied over time in the form of a periodic ramp signal, and wherein a time-delay between the electrical radar driver signal and the electrical reference signal, and a slope of the ramp signal fulfils the following equation:

$$(S \cdot (dT + 2 \cdot D\,min/C)) > 1\,\text{Mhz}$$

wherein Dmin designates a predefined nominal minimum distance of a predefined nominal distance range, dT the time delay, C the speed of light, and S the ramp's slope that defines the frequency change over time.

19. Method of claim 16 wherein the filter is a high-pass filter having a cut-off frequency, and wherein the cut-off-frequency corresponds to a radar frequency response in the mixed signal that would be provoked by a detected object located at a nominal maximum distance of a predefined nominal distance range.

20. Method of claim 16 wherein an amplifier that is arranged between the mixer and the optical modulator, amplifies the filtered signal and generates an amplified signal, wherein the optical modulator is a Mach-Zehnder-modulator and controlled by the amplified signal, and wherein the amplification of the amplifier is limited such that the following condition is fulfilled:

$$V\text{in max}(f)/Vpi < 0.2$$

wherein Vinmax designates the maximum amplitude of the amplified signal and Vpi the voltage necessary to switch the optical output power of the Mach-Zehnder-modulator between on and off, and wherein said condition is fulfilled for all frequencies within said second-order high-pass filtering range of said filter.

* * * * *